Figure 1:
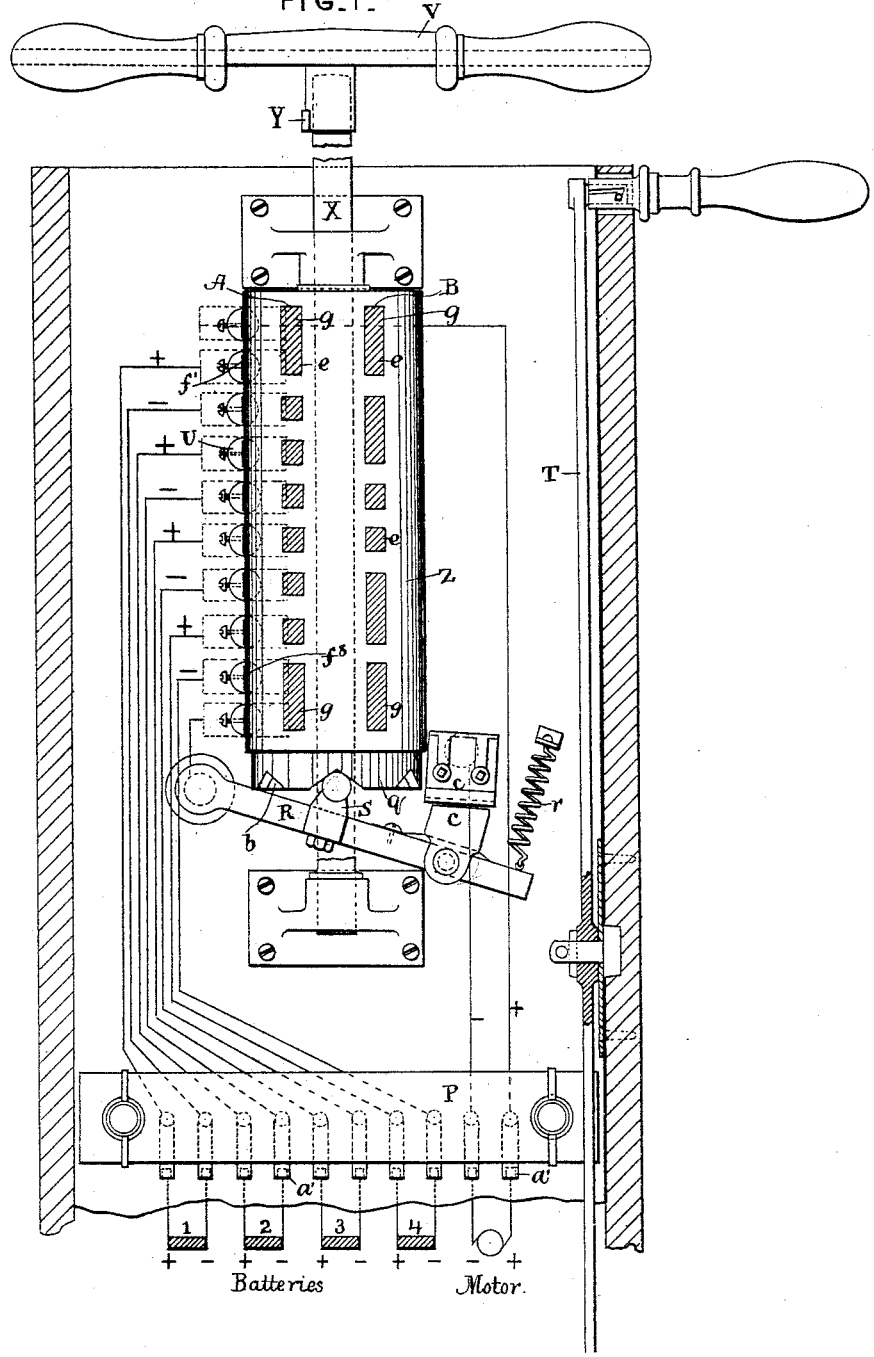

(No Model.)
3 Sheets—Sheet 1.

E. JULIEN.
REGULATING COMMUTATOR FOR SECONDARY BATTERIES.

No. 384,447. Patented June 12, 1888.

WITNESSES:

INVENTOR.
Edmond Julien
BY
Knight Bros
ATTORNEYS.

(No Model.) 3 Sheets—Sheet 2.
E. JULIEN.
REGULATING COMMUTATOR FOR SECONDARY BATTERIES.
No. 384,447. Patented June 12, 1888.
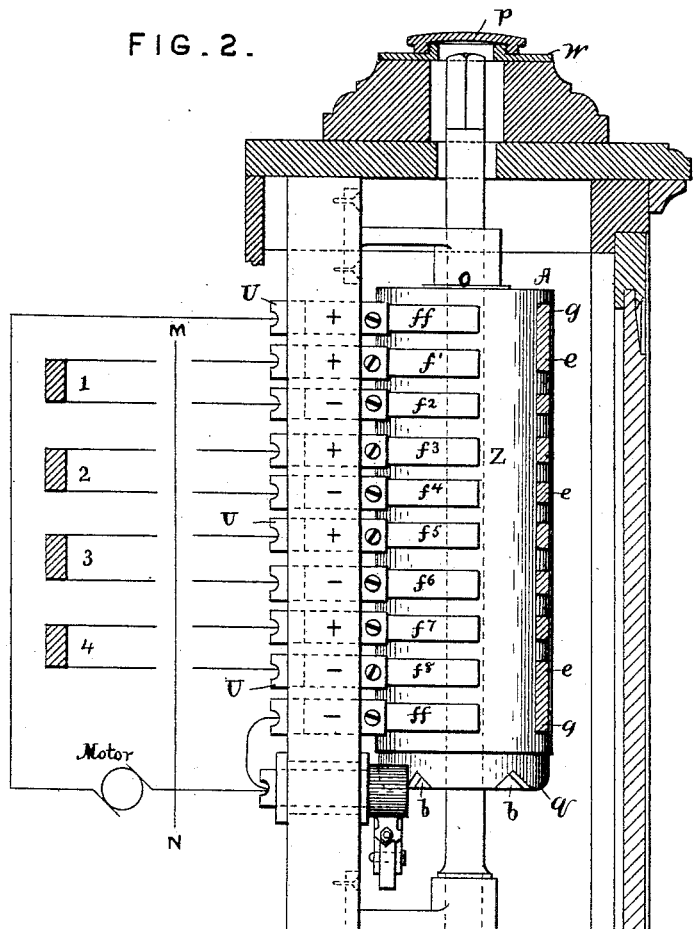
FIG. 2.
FIG. 5.
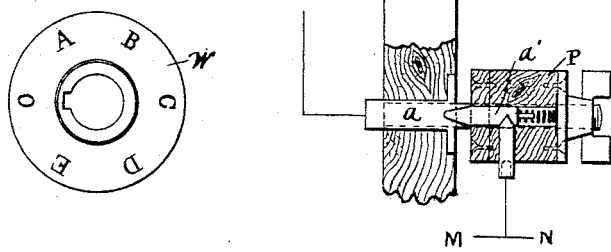
WITNESSES:
INVENTOR.
Edmond Julien
BY
Knight Bros
ATTORNEY.

(No Model.) 3 Sheets—Sheet

E. JULIEN.
REGULATING COMMUTATOR FOR SECONDARY BATTERIES.

No. 384,447. Patented June 12, 1888.

WITNESSES:
Edward Steer.
H. B. Knight.

INVENTOR.
Edmond Julien.
BY Knight Bros.
ATTORNEYS.

UNITED STATES PATENT OFFICE.

EDMOND JULIEN, OF BRUSSELS, BELGIUM, ASSIGNOR TO THE JULIEN ELECTRIC COMPANY, OF NEW YORK, N. Y.

REGULATING-COMMUTATOR FOR SECONDARY BATTERIES.

SPECIFICATION forming part of Letters Patent No. 384,447, dated June 12, 1888.

Original application filed February 17, 1886, Serial No. 192,249. Divided and this application filed December 9, 1886. Serial No. 221,119. (No model.) Patented in Belgium February 15, 1884, No. 64,170; in Germany February 15, 1886, Nos. 40,623 and 40,641; in England February 19, 1886, No. 2,470; in Italy March 20, 1886, No. 66; in France November 8, 1886, No. 179,509; in Spain November 27, 1886, No. 10,387, and in Portugal December 30, 1886, No. 1,110.

*To all whom it may concern:*

Be it known that I, EDMOND JULIEN, a subject of the King of Belgium, residing at Brussels, Belgium, have invented certain new and useful Improvements in Regulating-Commutators, (for which I have obtained Letters Patent in Belgium, dated February 15, 1884, No. 64,170; Great Britain, dated February 19, 1886, No. 2,470; Italy, dated March 20, 1886, No. 66; France, dated November 8, 1886, No. 179,509; Spain, November 27, 1886, No. 10,387; Portugal, December 30, 1886, No. 1,110; Germany, dated February 15, 1886, Nos. 40,623 and 40,641,) of which the following is a specification.

There exists no practical apparatus by means of which various groupings of primary and secondary batteries can be rapidly and simply effected when the number of the batteries is more than two. Where it has formerly been necessary to attain this object very complicated means have been employed, and in no case can the change in the grouping of the batteries be rapidly effected.

My improved apparatus supplies this want—that is, a commutator having multiple couplings capable of regulating an electric current and grouping instantaneously and in any manner desired any number of batteries.

My apparatus is indispensable in the application of electricity to traction to regulate the movement of the vehicles, and when thus employed it is designated a "controlling commutator" or "regulator."

I will describe the apparatus as employed upon an electric vehicle or car driven by a battery of accumulators divided into four independent series. The several elements forming a single series are permanently connected, and in the description, therefore, each of the independent series may be treated as if it were a single battery or element.

Referring to the claims for specific pointing out of the novel features of my invention, I will first describe the latter in detail with reference to the accompanying drawings, in which—

Figure 3:
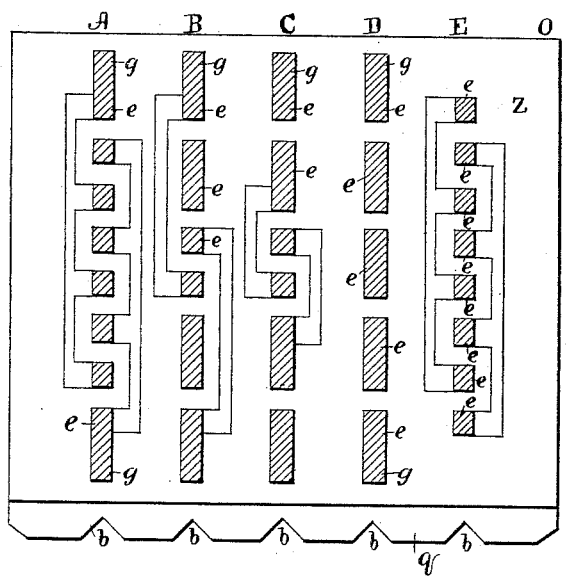
Figure 4:
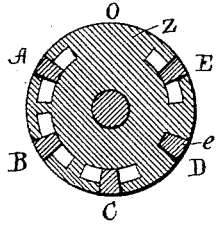

Figure 1 is a face view of a cylindrical regulator with multiple couplings, showing also a diagram of the circuit. Fig. 2 is a side elevation of the apparatus partially in section, and showing, also, a diagram of the circuit. Fig. 3 is a development in plane of the cylinder, showing the connections of the contact-pieces interior of the cylinder. Fig. 4 is a transverse section of the cylinder. Fig. 5 is a top view of the indicator-plate.

My regulator is composed of a cylinder, Z, of ebonite or other insulating material, carried by a metallic shaft, X, having a hand lever or wheel, V. In the surface of the cylinder I place the lines A B C D E, &c., of contacts or terminals $e$, each line being insulated from the adjacent ones. There are as many lines of contact-pieces as there are variations of grouping of the batteries to be obtained, the variations of grouping being effected by connecting the terminals together in various ways, as shown. Each line has twice as many exterior contact-pieces as there are series or subdivisions of the battery. These contact-pieces, arranged in a single line at the surface of the cylinder, are intended to come in contact with the fixed contact-springs $f'$ to $f^5$, which are connected with the poles of the several series of accumulators. Two additional contact-pieces or terminals, $g$, are connected to the end pieces, $e$, of each line of contacts, and are so arranged as to make connection with the two fixed springs, $ff$, electrically connected to the working-circuit, which in this case includes a motor or electrical machine.

The springs or brushes $f f f$ are furnished with conductors, soldered or otherwise connected to the contact-studs $a$, inserted into the support or backing of the apparatus, and adapted to receive the terminals $a'$ of a bar, P, of insulating material, to which terminals are connected the ends of the conductors leading to the series of the battery and to the motor. The parts $a\ a'$ are made so as to enter one into the other to close the circuit. Therefore it is only necessary to fix the bar P in the position shown against the support or backing, and automatically contact is obtained, the pieces A' being pressed outward for the purpose by means of springs placed in rear thereof. The operation is thus simplified and at the same time the perfection of the service assured.

The cylinder carries at its base a ring, $q$, of hard metal, in the lower edge of which are formed as many notches $b$, plus one, as there are lines of contact-pieces on the cylinder Z.

The following description will render more clear the details of the construction of the mechanism.

The battery being supposed to be divided in four series, 1 2 3 4, there will be provided eight brushes, $f'\ f^2\ f^3\ f^4$, &c. The brush $f'$ is connected to the + pole of the series 1, and the brush $f^2$ to the — pole of the same series. In the same manner brushes $f^3$ and $f^4$ are connected to the poles of the series 2, and so on. The two end brushes, $f\!f$, are respectively connected to the positive and negative poles of the motor. When the regulator is placed at the notch corresponding to the position O, as shown in Fig. 2, the brushes are not in contact with the terminals and the circuit is open. If, then, by means of the hand lever or wheel V, I turn the cylinder under the brushes until the latter make contact with the said terminals $e$ on the line of connection A the circuit is closed and four series grouped in quantity. By continuing the rotation the cylinder brings the line of contact B against the brushes, and the circuit is then again closed with the series 1 2 and 3 4 grouped by twos in quantity, the two groups of two series each being connected in series. At the notch corresponding to the line C the commutator unites the two intermediate series, 2 and 3, in quantity, and therefore groups three series in tension. At the fourth line, D, the four series are coupled in tension. At every change of grouping of the batteries in the order named there will result for equal work to be performed an increased speed of the motor, which may be made effective in maintaining the proper normal speed of the same, whatever the resistance of the road. It will be noticed that at the third notch, corresponding to the line C, the series 2 and 3 will each furnish only one-half of the current supplied by the other two. In order, therefore, that the quantity of electricity shall remain the same in all of the series, I arrange in the ring $q$ of the cylinder a notch corresponding to a line of connection, E, which, when the machine is at rest, unites the like poles of all the series in such manner that the latter being in opposition the quantity of electricity in all the elements will be equalized. This last line of contact is not supplied with the terminals $g$, corresponding to the brushes $f\!f$, connected to the motor.

By means of this regulator having multiple couplings I obtain, also, a valuable practical result in that all of the elements of a battery always work at the same time, whatever their number and whatever the manner of grouping the series, and, further, that, the expenditure of electricity being equalized in the series, the uniform recharging of all of the series is rendered possible. This last result is of so great a practical importance that if it were not possible to obtain it it would be necessary to abandon the employment of accumulators for traction.

It is seen that cylinder Z is mounted on a shaft, X, carried by supports fixed to a vertical backing of wood, and that it is moved by means of the hand-lever under the brushes, which are fixed in terminals U, inserted into the backing. When the cylinder turns under the brushes and the latter leave one line of contact, sparks are produced which tend to deteriorate the body of the cylinder and the contact-pieces. To remedy this I employ a lever, R, having a projection, S, and arranged to automatically open the circuit through the motor at $c\ c$ before the brushes leave the line of contact, and to close the circuit again at the desired moment. Thus the sparking is produced at the pieces $c\ c$, which can be easily replaced at slight cost. A roller may be carried by projection S to lessen the friction. The automatic movement of the lever R is obtained by the action of the projection S bearing in the notches $b$, formed in the ring at the base of the cylinder, the lever being drawn upward for this purpose by a spring, $r$. Attention is called to the fact that besides having the function of operating the circuit-breaker the notches $b$ serve as guides to the operator in turning the cylinder.

The position of the circuit-breaking lever R may be varied from that shown in the drawings. It can, for example, be horizontal or vertical. It may diminish further the sparking by means of resistances introduced automatically into the circuit by movement of the lever R.

The apparatus above described has the advantage, when it is employed as a movement-regulator for vehicles, of dispensing with the resistance-coils and other devices which are indispensable in other systems for regulating the speed of vehicles, and the employment of which is expensive and inconvenient. It will be seen that groupings more or less numerous than those herein described are obtainable by increasing or diminishing the lines of contact and altering the apparatus to correspond. I reserve, also, the right to modify, as the need may occur, the arrangement of the connecting-lines in the cylinder. As for the form of the apparatus, it is important to notice that instead of a cylinder I may employ an apparatus similar in principle, but flat. Fig. 3, showing the plane development of the cylinder and its contacts, may be imagined to represent the flat form here suggested. In this case the brushes would be modified in form and mounted on a movable piece sliding over the flat plate, so as to make connection with any line of contact.

The invention herein described forms a part of the apparatus of a general system of electric traction for which I made application for Letters Patent of the United States the 17th of February, 1886, Serial No. 192,249, of which application the present case forms a division.

To inform the operator of the position of the cylinder, I letter or number the plate W, as shown in Fig. 5. This plate is placed on top of the casing of the regulator.

It is important that when the regulator at one end of the car is to be used the other shall be placed and shall remain at the neutral point to avoid short circuiting. Therefore I employ a single hand-lever for operating both regulators, which lever is so retained by indicator-plate W and stud Y upon the shank of the lever that it can only be removed when the cylinder is so placed that the brushes are out of contact with all of the terminals on the cylinder. When the lever is removed, no means exist for readily turning the shaft. To insure it from meddling and protect it from rain, I employ a cap, $p$, which may be screwed onto the case of the regulator when the hand-lever is removed, as shown in Fig. 2. This may also serve as a means for protecting the reversing-lever T, which is pivoted to the side thereof, as shown in Fig. 1.

Having thus described my invention, what I claim as new therein, and desire to secure by Letters Patent, is—

1. In combination with a number of independent batteries and a translating device, a current-regulator consisting of a series of brushes forming the terminals of the circuits of said batteries and translating device, and an insulating-block adapted to be moved relatively to said brushes and containing a number of lines of contact-pieces, $e\,g$, variously connected together in the different lines and adapted to make contact with the brushes of all the batteries and translating device and to arrange the batteries in various groups, and a further line of contacts, $e$, of number corresponding to the number of battery-terminals and so connected as to connect the batteries together in multiple arc at the same time that the translating device is cut out of the circuit, substantially as and for the purpose set forth.

2. In combination with a number of independent sources of electricity, a regulator having multiple couplings for coupling said sources in various orders, and a circuit-breaker operated by said regulator, substantially as and for the purpose set forth.

3. In combination with a current-regulator consisting of an insulating-support, lines of contact terminals carried thereby, and means for including any one of said lines in an electric circuit, the contact-pieces $c\,c$ in the circuit, one fixed, the other carried by a lever operated by the movement of the current-regulator, substantially as and for the purpose set forth.

4. In combination with a current-regulator and a backing whereon the same is mounted, a line of studs on said backing electrically connected with the current-regulator, a movable insulating-bar carrying terminals electrically connected with sources of electricity and a translating device, and springs in rear of said terminals, substantially as and for the purpose set forth.

5. The combination of a number of batteries, a motor, electric circuits, a current-regulator for connecting said batteries in various groups in circuit with said motor and disconnecting the motor from the circuit, a shaft for operating said regulator, a lever for operating said shaft, and a stud and notched disk, substantially as described, whereby removal of the lever is prevented unless the regulator is placed so as to throw the motor out of circuit, substantially as set forth.

EDMOND JULIEN.

Attest:
 HARRY E. KNIGHT,
 H. S. KNIGHT.